United States Patent [19]

Novak

[11] 4,152,506

[45] May 1, 1979

[54] PREPARATION OF THERMOFORMABLE METHYL METHACRYLATE SHEETS

[75] Inventor: Ernest R. Novak, Vienna, W. Va.

[73] Assignee: E. I. Du Pont de Nemours and Company, Wilmington, Del.

[21] Appl. No.: 900,236

[22] Filed: Apr. 26, 1978

[51] Int. Cl.$^2$ .......................... C08F 2/38; C08F 20/14
[52] U.S. Cl. ...................................... 526/224; 526/73; 526/78; 526/89; 526/193; 526/206; 526/323.2; 526/328.5; 526/329.7
[58] Field of Search ..................... 526/73, 78, 89, 193, 526/206, 224, 323.2, 328.5, 329.7

[56] References Cited

U.S. PATENT DOCUMENTS

| | | | |
|---|---|---|---|
| 3,362,942 | 1/1968 | Munn | 526/329.7 |
| 3,380,980 | 4/1968 | Calkins et al. | 526/329.7 |

FOREIGN PATENT DOCUMENTS

| | | | |
|---|---|---|---|
| 870191 | 6/1961 | United Kingdom | 526/329.7 |
| 907261 | 10/1962 | United Kingdom | 526/329.7 |
| 1013688 | 12/1965 | United Kingdom | 526/329.7 |

*Primary Examiner*—Harry Wong, Jr.

[57] ABSTRACT

In casting methacrylate sheets for thermoforming applications, it has heretofore been the practice to add chain transfer agents to the polymerization mix for forming syrup. It has now been found that addition of chain transfer agent can be delayed until after the syrup has been prepared with no loss in thermoformability of sheets prepared from the syrup.

7 Claims, No Drawings

PREPARATION OF THERMOFORMABLE METHYL METHACRYLATE SHEETS

BACKGROUND

Continuously cast acrylic sheet is prepared from methyl methacrylate monomer in two stages. First monomer is partially polymerized to obtain a syrup containing both monomer and polymer. Usually, the syrup contains about 20–30% polymer. The syrup is then cast into sheet form and the polymerization continued. This two stage polymerization is preferred because polymerization in the cast operation proceeds at a faster rate than if polymerization proceeded from a monomer mix alone.

Two types of acrylic sheet are prepared by the foregoing procedure. A so-called "general purpose" sheet having a high molecular weight is prepared by carrying out both stages of the polymerization in the absence of a chain transfer agent (i.e., an agent which terminates growth of one polymer chain and starts growth of another chain). The other type of sheet is a so-called "thermoformable" sheet which is prepared by employing a chain transfer agent and a crosslinking agent. The chain transfer agent keeps the molecular weight of the polymer low which is necessary for thermoformability, thus it is added to the monomer mix used to prepare syrup. The crosslinking agent provides a means for obtaining a crosslinked network of high molecular weight and it is ordinarily added to the syrup.

Because the chain transfer agent is present during preparation of the syrup for thermoformable sheets, the syrup cannot then be used to prepare general purpose sheets. Furthermore, the syrup preparation and storage equipment must be cleaned every time it is desired to switch from preparation of syrup for thermoforming sheet to syrup for general purpose sheet. It would be desirable to be able to employ one syrup that could be used to prepare both thermoformable sheet or general purpose sheet.

SUMMARY OF THE INVENTION

It has now been found that the chain transfer agent used in making thermoformable sheet can be added to the syrup, rather than to the monomer mix used to prepare the syrup and that useful thermoformable sheets can still be obtained. Thus, both general purpose sheet and thermoformable sheet can be made from the same syrup and the syrup preparation equipment need not be cleaned after each batch of syrup preparation.

Specifically, this invention is a process for preparing a thermoformable cast methyl methacrylate polymer sheet which comprises in sequence (1) polymerizing methyl methacrylate monomer until about 5–50 percent by weight of the methyl methacrylate monomer present has polymerized, (2) adding to the polymerizate obtained in step (1) a chain transfer agent in an amount of between about 0.05 and about 1.0 percent by weight of polymerizate, and a crosslinking agent in an amount of between about 0.05 and about 2.0% by weight of polymerizate, (3) casting the mixture of step (2) in the form of a sheet and polymerizing the remaining monomer in the mixture for a time sufficient to obtain a self-supporting sheet.

DESCRIPTION

The function of a chain transfer agent is to limit the molecular weight of a polymer being prepared, while the function of the crosslinking agent is to form a crosslinked network of high molecular weight. Thus, if both are present together during polymerization, it would be expected that the two agents would counteract one another unless a large amount of chain transfer agent were employed compared with crosslinking agent. Surprisingly, however, it was found that the amount of chain transfer agent required in the process of this invention was not greater than the amount that had heretofore been used in the initial polymerizaton to prepare syrup.

The monomer mix employed herein contains at least about 80% by weight methyl methacrylate and preferably 100%. When comonomer is present the comonomer can be any ethylenically unsaturated monomer that copolymerizes with methyl methacrylate. Examples of comonomers include other lower alkyl methacrylates or a lower alkyl acrylate or alkylene aromatic comonomers such as styrene. The term "methyl methacrylate polymer" includes copolymers of methyl methacrylate and such comonomers.

The monomer mix is polymerized by usual procedures to obtain a mixture of about 5–50%, preferably about 15–40% and most preferably about 20–30%, by weight, polymer, with the remainder being substantially monomer. The resulting mixture is commonly referred to as "syrup". Polymerization of the monomer mix is carried out by adding a free-radical initiator and conducting the polymerization at between about 50° C. and about 180° C. Pressure is not critical and conveniently autogenous or atmospheric pressure is employed.

The syrup also contains an initiator, such as an azo or peroxide initiator and the like. The syrup can also contain mold release agents, such as stearic acid and the like; or dyes or pigments.

To the syrup so obtained, a chain transfer agent and a crosslinking agent is added. The chain transfer agent is added in an amount to obtain a concentration in the syrup of between about 0.05% and about 1.0% based on weight of syrup; while the concentration of the crosslinking agent added is between about 0.05% and about 2.0% based on the weight of syrup.

The chain transfer agent can be a mercaptan, e.g., alkyl mercaptans of up to 20 carbon atoms, especially n-alkyl mercaptans of between about 4 and 20 carbon atoms, or aryl mercaptans in which the aryl group can be phenyl or naphthyl and which can contain alkyl (of 1–12 carbon atoms) or halogen (Cl, Br, I) substituents; polyhaloalkanes (preferably of 1–5 carbon atoms); phosphines such as $R_2PH$ or $RPH_2$ wherein R is aryl of 6–10 carbon atoms, or alkyl of 1–10 carbon atoms.

The crosslinking agent can be any organic compound that is copolymerizable with the methyl methacrylate monomer and which contains at least two ethylenically unsaturated double bonds, e.g., a diacrylate or dimethacrylate, such as the alkylene or hydroxy substituted alkylene diacrylates or dimethacrylate, e.g., 1,2-ethylene dimethacrylate or 1,6-hexanediol dimethylacrylate.

The syrup is cast into a sheet and enough of the monomer remaining in the syrup is polymerized to obtain a self-supporting film. Casting and completion of polymerization is carried out by any of the usual procedures, as for example, by adding initiator and placing the syrup into a mold. The outside of the mold is maintained at between about 50° C. and about 100° C. by use of a heat transfer medium such as water. A detailed description is found in U.S. Pat. No. 3,872,197.

The tensile properties of the thermoformable sheet obtained can be adjusted by varying the amount or the kind of chain transfer agent, the amount of crosslinking agent and by changing the crosslinking agent. Generally increasing the amount of chain transfer agent lowers modulus and tensile strength, but increases ultimate elongation; while increasing the amount of crosslinking agent increases tensile strength, and tensile modulus but lowers the ultimate elongation. The main purpose of the crosslinking agent is to eliminate the "yield point". Presence of a yield point indicates that the sheet is elongating primarily in one area. Such uneven elongation of the sheet results in objects of uneven thickness, which may be undesirable depending on the object desired. While it is difficult to generalize the exact amount of crosslinking agent required, it appears that with the chain transfer agent and cross-linking agent used in the examples, the amount of crosslinking agent present should be at least two-thirds the amount of chain transfer agent present and preferably as much or more of the crosslinking agent should be present. With different chain transfer and crosslinking agents one may expect to find different ratios.

In the examples which follow, viscosity of the syrup obtained was measured wth a Brookfield® Model HBT viscometer, No. 2 spindle, spindle rpm 50, and percent polymer in the syrup obtained was estimated from refractive index values of the syrup.

The following Examples illustrate the invention.

EXAMPLE 1

Preparation of Syrup

Methyl methacrylate monomer was partially polymerized by heating at between 80–100° C. in the presence of 2,2'-azobis(2,4-dimethylvaleronitrile) initiator. In some preparations dodecyl mercaptan was employed as a chain transfer agent at the beginning of the polymerization. Polymerization was halted after about 5 to 35 minutes of heating at the aforesaid temperature range.

The following syrups were prepared:

| Syrup | Methyl Methacrylate Monomer employed (g) | Initiator employed (g) | Minutes of Heating | Dodecyl Mercaptan employed (ml) | Syrup Data B.V. (cps) | % Polymer in syrup |
|---|---|---|---|---|---|---|
| 1 | 1200 | 0.78 | 19 | 0 | 720 | 27 |
| 2 | 1076 | 0.69 | <20 | 0 | 760 | 18 |
| 3 | 1200 | 1.2 | 20 | 3.6 | 740 | 31 |

Casting and Completion of Polymerization 100 g of each of the syrups were cast after adding 2,2'-azobis(2,4-dimethylvaleronitrile) initiator dissolved in 4ml methyl methacylate (MMA) in an amount of 1% by weight. To syrup 1 was added a chain transfer agent (dodecyl mercaptan) and a crosslinking agent (ethylene dimethacrylate). No additives were added to syrup 2. To syrup 3 was added the crosslinking agent. These syrups were cast between glass plates in casting cells immersed in a water bath (water in the bath was at 70–80° C.) and held for 0.5 to 1 hour until polymerization was complete. Completion was measured by cessation of heat evolution. The casting cells were then placed in a 130° C. oven for about 1 hour to postcure the sheets. Tensile bars were cut from the sheets (which were about ⅛ inch thick). The bars were tested in an Instron® at an elongation rate of 571%/minute at 160° C. to obtain tensile strength (TS), tensile modulus (TM) and percent elongation (Elong.).

Sheet Preparation

Syrup 1 was cast and polymerized as described immediately above, heat adding 0.4 ml dodecyl mercaptan and 0.5 ml 1,2-ethylene dimethacrylate per 100 g of syrup to form CASTING COMPOSITION 1-A. Another 100 g portion of syrup 1 was cast and polymerized as described immediately above, after adding 0.3 ml dodecyl mercaptan and 0.3 ml 1,2-ethylene dimethacrylate to form CASTING COMPOSITION 1-B. Properties of the compositions are set forth in the table below.

General Purpose Sheet

Syrup 2 was cast and polymerized as described immediately above. No additional additives were added. The resulting sheet is referred to in the table below as GENERAL PURPOSE COMPOSITION.

Art Thermoformable Sheet

Syrup 3 was cast and polymerized as described immediately above, after adding 0.3 ml 1,2-ethylene dimethacrylate to form ART COMPOSITION Y.

Properties of ART COMPOSITION Y are set forth in the table below.

| Tensile Properties of Sheets at 160° C., 571%/min Elongation | | | |
|---|---|---|---|
| | Tensile Strength (psi) | Tensile Modulus (psi) | Ultimate Elongation (%) |
| CASTING COMPOSITION 1-A | 92 | 163 | 304 |
| CASTING COMPOSITION 1-B | 114 | 194 | 372 |
| GENERAL PURPOSE COMPOSITION | 132 | 384 | 134 |
| ART COMPOSITION Y | 110 | 218 | 435 |

Sheets of good thermoformability tend to possess low tensile modulus values and high ultimate elongation values. This combination of properties facilitates handling at thermoforming conditions. It is seen that the art thermoformable sheets of ART COMPOSITION Y had a lower tensile modules value and a higher ultimate elongation value than the sheet of the GENERAL PURPOSE COMPOSITION.

Similarly, it is seen that sheets of CASTING COMPOSITIONS 1-A and 1-B (which were prepared by the process of this invention) both have a tensile modulus value lower than any of the other compositions of the table and have ultimate elongation values higher than that of the sheet of GENERAL PURPOSE COMPOSITION. Thus, the value of the process of this invention for preparing thermoformable sheets from a syrup which was prepared in the absence of chain transfer agent and crosslinking agent is evident.

EXAMPLE 2

Using the procedure for Preparation of Syrup the following syrups were prepared. No chain transfer agent was employed. B. V. means Brookfield Viscosity.

| Syrup | Methyl Methacrylate (MMA) Monomer employed (g) | Initiator employed (g) | Syrup Data B.V. (cps) | % Polymer in syrup |
|---|---|---|---|---|
| A | 1200 | 0.78 | 720 | 27 |
| B | 1000 | 0.30 | 960 | 19 |
| C | 1000 | 0.30 | 3900 | 22 |
| D | 1600 | 1.04 | 1820 | 26 |

336.37 g of syrup A, 387.5 g of syrup B, 505.32 g of syrup C and 1600 g of syrup D were combined. The resulting syrup was then cast and polymerized according to the conditions set forth in the procedure for Casting and Completion of Polymerization, except as noted otherwise in the table below, to obtain a number of thermoformable sheets prepared according to the process of this invention. Both dodecyl mercaptan (DM) and 1,2-ethylene dimethacrylate (EDMA) were added to the syrup. Conditions, additives employed and properties of sheets prepared are recorded in the following table.

Tensile properties were obtained on the Instron ® instrument as previously described. "Time to peak" records the time interval from when the cast syrup reaches the water bath temperature to when the maximum temperature is reached, while ΔT at peak os the difference between the maximum temperature and the temperature of the water bath.

In the last 3 runs (numbered 18, 19, and 20) it is seen that the amount of chain transfer agent present exceeds the amount of crosslinking agent present. A yield point was observed in the tensile bars produced from these runs. Thus, in these runs, too much chain transfer agent was present.

| | Casting Syrup, 100 g Syrup Plus | | | | |
|---|---|---|---|---|---|
| Run No. | EDMA, ml | D.M. ml | Initiator, ml 1% Sol. in MMA | Time to Peak (Min.) | ΔT at Peak (° C.) |
| 1 | 0.2 | 0.1 | 6 | 27.8 | 19 |
| 2 | 0.4 | 0.4 | 6 | 44.2 | 8 |
| 3 | 0.2 | 0.4 | 14 | 21.6 | 23 |
| 4 | 0.4 | 0.1 | 14 | 13.8 | 37 |
| 5 | 0.3 | 0.25 | 10 | 23.5 | 20 |
| 6 | 0.3 | 0.25 | 10 | 22.6 | 23 |
| 7 | 0.4 | 0.4 | 14 | 21.7 | 23 |
| 8 | 0.2 | 0.1 | 14 | 13.9 | 36 |
| 9 | 0.4 | 0.1 | 6 | 23.5 | 28 |
| 10 | 0.3 | 0.25 | 10 | 24.0 | 21 |
| 11 | 0.47 | 0.25 | 10 | 22.0 | 21 |
| 12 | 0.3 | 0.25 | 3.3 | 55.6 | 5 |
| 13 | 0.3 | 0.25 | 16.7 | 14.2 | 27 |
| 14 | 0.3 | 0.25 | 10 | 21.1 | 25 |
| 15 | 0.4 | 0.25 | 10 | 20.6 | 23 |
| 16 | 0.55 | 0.25 | 10 | 18.6 | 30 |
| 17* | 0.40 | 0.25 | 10 | 20.5 | 23 |
| 18 | 0.2 | 0.4 | 6 | 45.0 | 9 |
| 19 | 0.3 | 0.652 | 10 | 34.8 | 11 |
| 20 | 0.13 | 0.25 | 10 | 22.8 | 24 |

*"Syrup" contained 78.9 g syrup plus 21.1 g color master batch containing pigments, and dispersing agents in acrylic polymer.

| | Tensile Properties of Cast Sheet at 160° C. | | | |
|---|---|---|---|---|
| Run No. | T.S., psi | T.M., psi | Yield Point | % Elong. |
| 1 | 141 | 229 | No. | 408 |
| 2 | 93 | 174 | " | 474 |
| 3 | 64 | 133 | " | 1100+ |
| 4 | 149 | 270 | " | 249 |
| 5 | 113 | 182 | " | 969 |
| 6 | 120 | 188 | " | 476 |
| 7 | 109 | 148 | " | 702 |
| 8 | 129 | 272 | " | 395 |
| 9 | 175 | 299 | " | 230 |
| 10 | 117 | 217 | " | 393 |
| 11 | 140 | 209 | " | 312 |
| 12 | 146 | 207 | " | 451 |
| 13 | 124 | 177 | " | 549 |
| 14 | 115 | 186 | " | 488 |
| 15 | 105 | 181 | " | 276 |
| 16 | 83Δ | 142 | " | 251 |
| 17* | 101 | 130 | " | 350 |
| 18 | 51 | 108 | Yes | 1100+ |
| 19 | 39 | 88 | " | 1100+ |
| 20 | 85 | 109 | " | 1100+ |

*"Syrup" contained 78.9 g syrup plus 21.1 g color master batch containing pigments, and dispersing agents in acrylic polymer.

It is seen that increasing the amount of initiator decreases the "time to peak" while increasing the amount of initiator also increases the "ΔT at peak". If the ΔT is too high the cast sheet may contain voids (believed to be caused by boiling of the monomer). It is important to balance the amount of chain transfer agent, crosslinking agent and initiator used since all three of these appear to have some effect on the "time to peak" and "ΔT at peak". Furthermore, the maximum amount of initiator that can be used and still obtain a void-free sheet will also depend on the rate of heat transfer from the polymerizing sheet to the surroundings.

Thermoformable sheets are useful in preparing molded, shaped articles such as bathtubs, kitchen sinks and the like.

I claim:

1. Process for preparing a thermoformable cast methyl methacrylate polymer sheet which comprises, in sequence,
   1. polymerizing methyl methacrylate monomer which is present in a monomer mixture in an amount of at least 80% by weight until between about 5 and 50 percent by weight of the methyl methacrylate monomer present has polymerized, said monomer mixture being free of any chain transfer agent,
   2. adding to the polymerizate obtained in step (1) a chain transfer agent in an amount of between about 0.05 and about 1.0 percent by weight of polymerizate and an organic crosslinking agent which is copolymerizable with methyl methacrylate and which is present in an amount of between about 0.05 and about 2.0 percent by weight of polymerizate, and,
   3. casting the mixture of step (2) in the form of a sheet and polymerizing remaining monomer in the mixture for a time sufficient to obtain a self-supporting sheet.

2. Process of claim 1 wherein the chain transfer agent is a mercaptan, polyhaloalkane or a phosphine, and the crosslinking agent is an organic compound that is copolymerizable with methyl methacrylate and which contains at least two ethylenically unsaturated double bonds.

3. Process of claim 1 wherein the chain transfer agent is a mercaptan, and the crosslinking agent is a dimethacrylate.

4. Process of claim 3 wherein the amount by weight of crosslinking agent present is at least two thirds or more the amount of chain transfer agent present.

5. Process of claim 3 wherein the mercaptan chain transfer agent is an n-alkyl mercaptan of between about 4 and 20 carbon atoms and the dimethacrylate crosslinking agent is 1,2-ethylene dimethacrylate.

6. Process of claim 5 where the amount by weight of crosslinking agent present is at least equal to or more than the amount of chain transfer agent present.

7. Process of claims 1, 2, 3, 4, 5 or 6 wherein step (1) is carried out at a temperature of between about 50° C. and about 180° C. and wherein the polymerization of step (3) is carried out in a mold in which the outer surface of the mold is maintained at a temperature between about 50° C. and about 100° C.

* * * * *